United States Patent [19]

Wirth

[11] 4,088,198
[45] May 9, 1978

[54] LOAD LEVER

[75] Inventor: Armin Wirth, Zurich, Switzerland

[73] Assignee: Wirth, Gallo & Co., Switzerland

[21] Appl. No.: 696,286

[22] Filed: Jun. 15, 1976

[30] Foreign Application Priority Data

Jun. 26, 1975 Germany .......................... 2528426

[51] Int. Cl.² ............................................ G01G 21/00
[52] U.S. Cl. .............................. 177/258; 177/DIG. 9
[58] Field of Search ............... 177/258, 259, 132, 133, 177/134, 135, DIG. 9

[56] References Cited

U.S. PATENT DOCUMENTS

| 1,171,998 | 2/1916 | Winslow | 177/258 |
| 1,549,977 | 8/1925 | Hem | 308/2 R |
| 2,611,606 | 9/1952 | Hadley | 177/258 |
| 2,961,231 | 11/1960 | Kucera | 177/258 X |

Primary Examiner—Joseph W. Hartary
Attorney, Agent, or Firm—Stevens, Davis, Miller & Mosher

[57] ABSTRACT

The invention concerns a balance provided with a load support, load compensating means and a lever system mounted between the load support and the load compensating means. The lever system comprises four equally long and identically designed three-knife load levers connected with the load compensating means by at least one intermediate lever, each of the four load levers being allocated to one out of four equally designed supporting points of a knife bearing body of the same intermediate lever.

2 Claims, 9 Drawing Figures

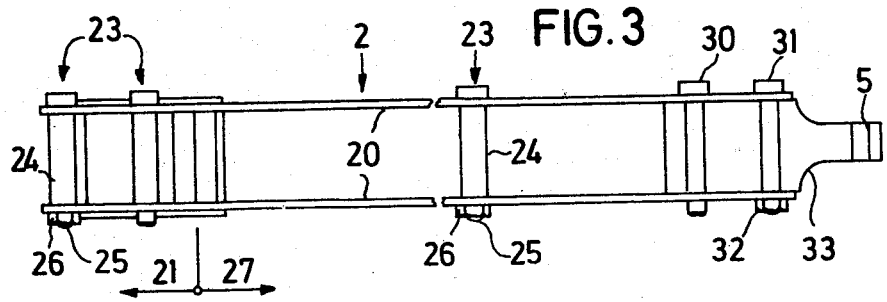
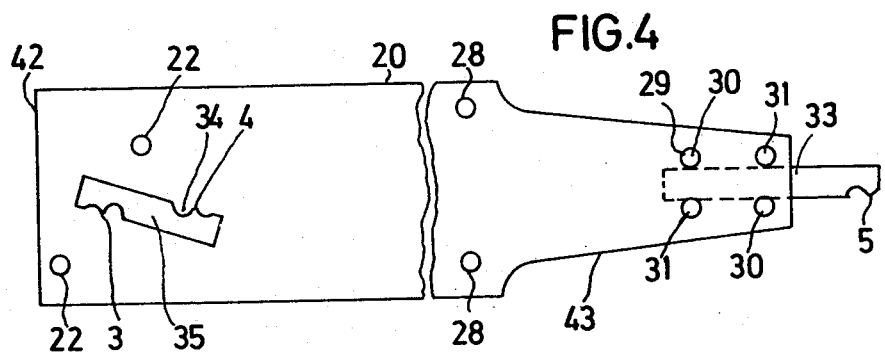
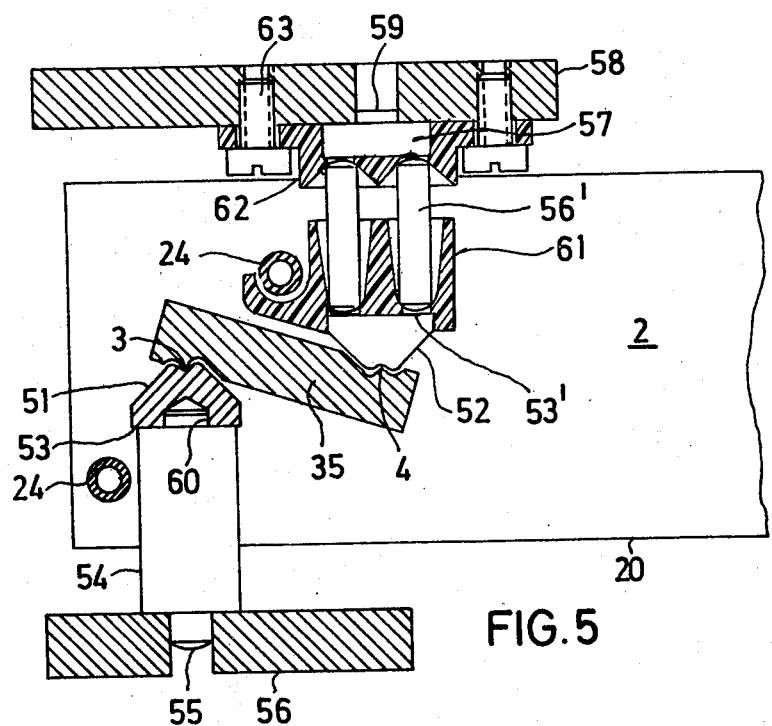

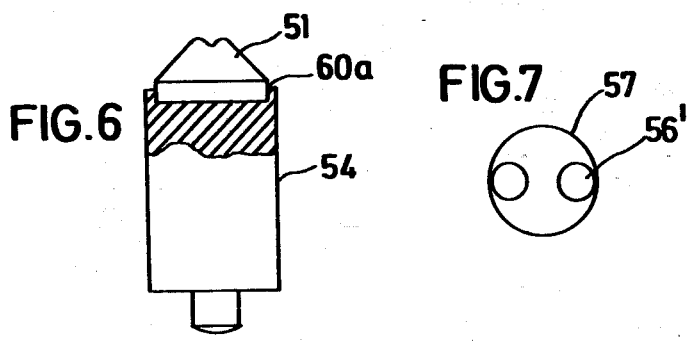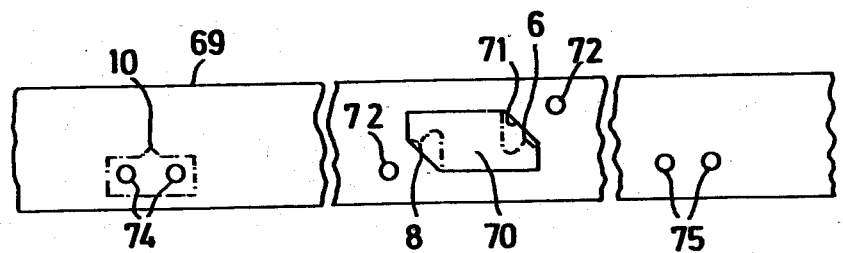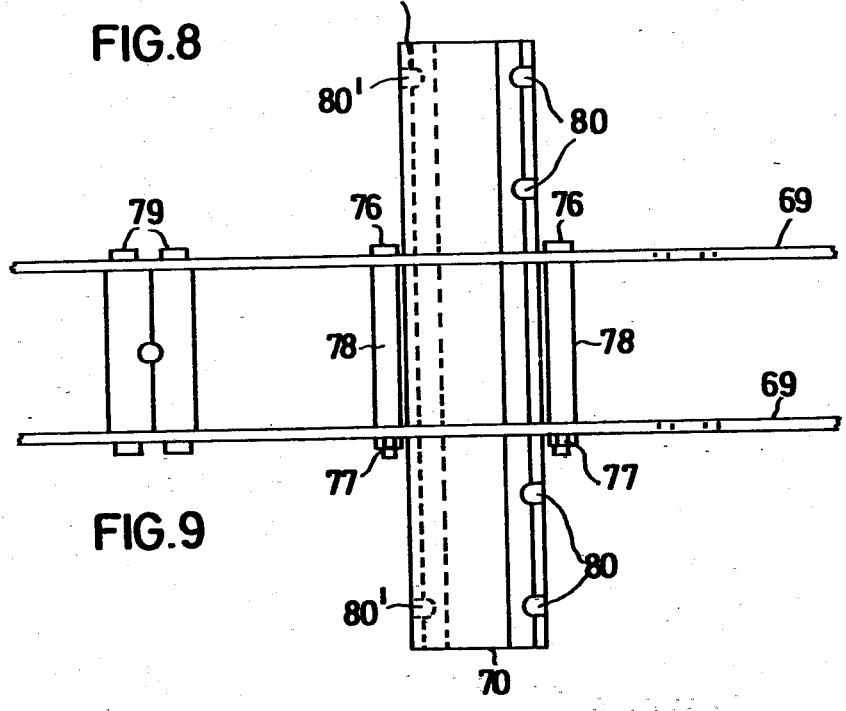

LOAD LEVER

The invention concerns a balance with a load support, load compensating means and a lever system mounted between the load support and the load compensating means and comprising four equally long three-knife load levers connected with the load compensating means by means of at least one intermediate lever.

Balances of this type are known from "Handbuch des Waagenbaues", Band 1, "Handbediente Waagen" by Jurgen Reimpell, 1955, page 372, FIG. 351e and FIG. 351g. These balances are designed as railway and vehicle balances in which the load support has such dimensions and such surface that it is easy to provide a great number of reduction steps. The load levers used are substantially shorter than half the length of the load support, whose full length is covered by means of intermediate levers. U.S. Pat. No. 1,549,977 gives an example of heavy and expensive load levers used in balances of this known type.

Because of the room required for such lever systems, it is difficult and uneconomical to use them with balances whose load support is small when compared with the room needed for such a lever system.

Accordingly, an object of the invention to provide a balance of the aforesaid type in which the lever system requires little room and, in particular, when a measuring cell is used as load compensating means and when a display is used which is mechanically disconnected from the bridge, also a very low total height and allows for a greater variety of multiplication steps in spite of low manufacturing costs.

Another object of the invention is to provide a balance in which each of the four load levers is allocated to one out of four equally designed supporting points of a knife bearing body of the same intermediate lever and in which the four load levers are not only equally long but also else identically designed.

A further object of the invention is to provide a balance in which the load levers and the first intermediate lever with which they are connected are levers fromed by two webs positioned on edge which are separated by distance sleeves.

Compared with known designs, balances according to the invention have the following advantages:

1. The costs for the material for the load levers and the intermediate levers are low,
2. The manufacturing costs for the load levers and the intermediate levers are low, it is possible to produce the iron web forming the levers by means of a single production step by means of a cutting; forming, punching or stamping tool. These advantages are decisive load supports having a length of more than 0.8 m and with weighing ranges of more than 100 kg.
3. Stocks are simplified: as material only bands are needed and as semi-manufactured parts only punched parts are needed.

In an embodiment of the invention the shorter arm length of the load levers on the input side is formed by twin-knife bodies mounted transversely in these levers and having along one of their edges the supporting knives of the load levers turned downwards and along their other edge the input knives turned upwards. The twin-knife bodies are mounted in such a way that for the zero position of the load levers both knives are in a horizontal plane. The shorter arm length on the input side of the intermediate lever on which the output knives of the load levers rest is formed by a twin-knive body mounted transversely in the intermediate lever and having along one of its edges its supporting knife turned downwards and along the other edge its input knife turned upwards.

The use of the twin knives allows to for greater adjusting and mounting precision than in known design in spite of lower mounting and adjustment costs.

Embodiments of the object of the invention are represented schematically in the drawing.

FIG. 3 is a horizontal projection of load lever,

FIG. 4 is a side view of a load lever,

FIG. 5 is a partial cross-section of the socket assembly of a load lever,

FIGS. 6, 7 are variants of the supporting socket and bracket illustrated in FIG. 5, FIG. 8 is a side view of an intermediate lever, and FIG. 9 is a horizontal projection of an intermediate lever.

Figure 1:
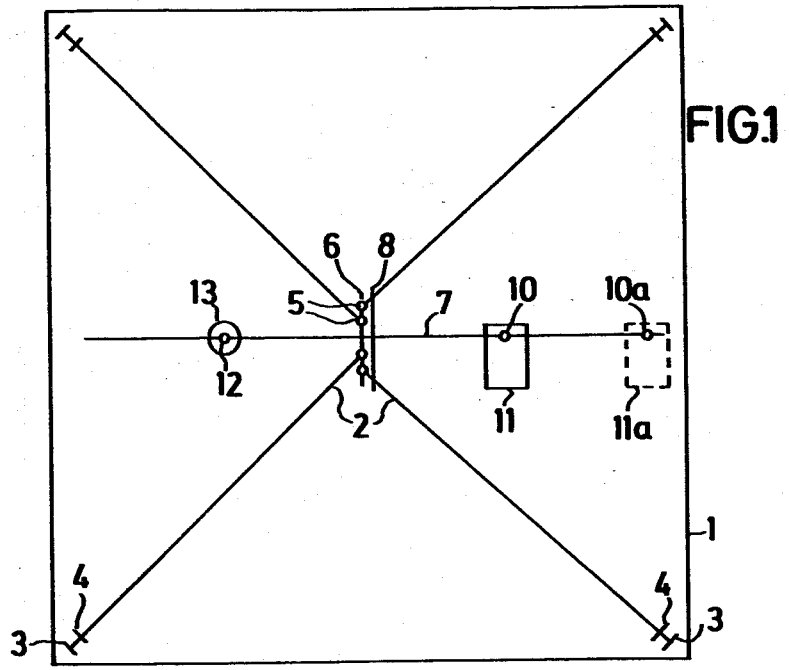
FIG. 1 is a horizontal projection of a first embodiment.

As illustrated FIG. 1, load support 1, which is substantially of square form, rests on four input knives 4 of four load levers 2, four intermediate elements (not shown) being mounted between load support 1 and input knives 4. Load levers 2 contain supporting knives 3 by means of which (and not illustrated further intermediate elements) they are supported on the frame (not shown) of the balance. The four output knives 5 of the four load levers 2 are loading by means of still further intermediate elements (not represented) input knife 6 of a single intermediate lever 7, which is supported in the frame by means of its supporting knife 8. It loads a measuring cell 11 by means of its output knife 10. This cell 11 constitutes the load compensating means in this embodiment. Alternative positions of knife 10 and cell 11 are shown as 10a and 11a. For these positions the transmission ratio will obviously be different.

In the embodiment according to FIG. 1 intermediate lever 7 is connected at 12 with a shock absorber 13. The distance between point 12 and supporting knife 8 is equal to that between knife 8 and output knife 10. The following numerical example shows how advantageous this basic scheme can be. With a load support of 800 × 800 mm, the length of the load levers shall be 450 mm. With a distance of 30 mm between knives 3 and 4, the multiplication ratio of the lever shall be 15:1. If knives 6 and 8 are 20 mm apart from each other and knives 8 and 10 33⅓ mm apart from each other, so the total multiplication ratio is 25:1. If knives 8 and 10 are 333⅓ mm apart from each other, this total ratio is 250:1. If the input force to cell 11 is for instance 40 N, then, with corresponding distances of knives 8 and 10 from each other, the weighing capacity is 100, 200, 500, and 1000 kg.

Figure 2:
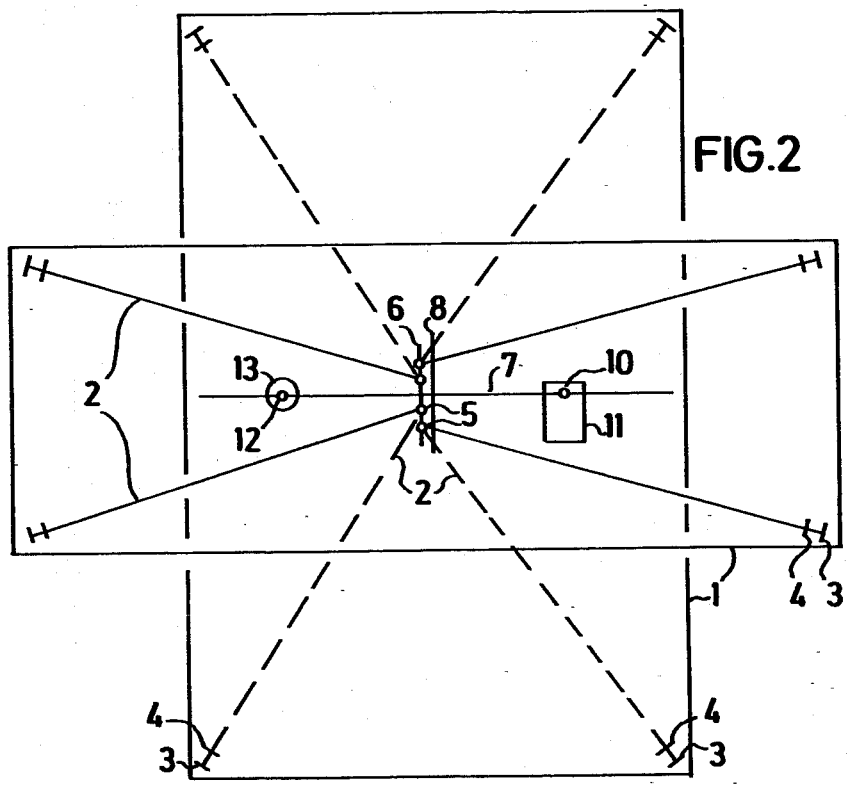
FIG. 2 shows two variants of FIG. 1 drawn over each other.

Particular requirements for the ratio of the side lengths of the load support can be taken into account easily without modification of the basic design and of the length of the levers. As shown in FIG. 2 the substantially square load support of FIG. 1 can easily have a rectangular shape whereby it is irrelevant whether its longer side is parallel or perpendicular to intermediate lever 7.

Load lever 2 is formed by two webs 20 edge cut from an iron sheet, distances sleeves 24, bolts 25 and nuts 26. The bolts 25 are introduced through holes 22 of webs 20. At its right end (in FIGS. 3 and 4) load lever 2 carries a body 33 with the output knife 5. In order to be able to adjust the transmission ratio of load lever 2, this body 33 is longitudinally movable and adjustable. Webs 20 contain holes 29 through which two pins 30 and two bolts 31 with nuts 32 are mounted as shown in FIG. 4. Pins 30 guide body 33 when shifted and bolts 31 with nuts 32 fix it in the selected position. This adjustment can be performed when the lever system is mounted and under load.

The load input arm length 21 is formed by a body 35 with twi knives. Body 35 is pressed into a correspondingly shaped hole 34 of one of the webs 20. It protrudes slightly from the outside surface of web 20. Body 35 contains supporting knife 3 and load knife 4.

Supporting knife 3 and load knife 4 are operatively connected with a supporting socket 51 and a load socket 52 (FIG. 5) as follows. Supporting knife 3 is supported by supporting socket 51 which has a flat surface 53 lying on a load lever supporting bracket 54. This bracket 54 has a pin 55 protruding into a hole of a plate 56 which is part of the frame or the base of the balance (not represented).

Load socket 52 is supported by load knife 4 of body 35. On its flat back 53' it carries two roller bodies 56' with rounded off ends acting as tilting supports. A plate 57 lays on these roller bodies 56'. This plate 57 is fixed to a plate 58, preferably in an adjustable manner. Plate 58 is part of the load support 1 not represented in FIG. 5.

Sockets 51 and 52 are dimensionally identical, they can be interchanged. When a socket is used as supporting socket its flat back surface 53 lies on the upper surface of bracket 54. When it is used as load socket, its flat back surface 53' supports the roller bodies 56'.

In the embodiment of FIG. 5 supporting socket 51 is rotatably mounted on bracket 54 by means of a central hole 60 and of a pin of bracket 54. In the embodiment of FIG. 6 bracket 54 has a cylindrical recess with a guiding surface 60a, so that the correspondingly shaped cylindrical back side of socket 51 can be introduced in this recess. When the socket is used as supporting socket a first cage 61, manufactured preferably from plastic maintains roller bodies 56' in their correct position. A second cage 62, also manufactured preferably from plastic, maintains the plate 57 in its correct position with regard to the roller bodies 56' with which it is operatively connected. Plate 57 has a pin 59 which protrudes into a hole of plate 58 and thereby determines the relative position of both plates. The second cage 62 which surrounds plate 57 is fixed to plate 58 by means of screws 63. The fact that the supporting socket 51 is rotatably mounted on bracket 54 makes it possible that it is automatically adjusted to the direction of the knives of the load levers 2 which can have different directions depending on the dimensions of load support 2 (FIGS. 1, 2).

The fact that the sockets have identical dimensions and that they can be used as supporting socket and as load socket, makes it possible to have manufacturing series twice as large as before, to simplify stocks and to have a better availability of spare parts.

As FIG. 3 shows it, knives 3, 4 supporting socket 51 with bracket 54, socket 52 with roller bodies 56', all can be mounted practically between webs 20. It is thereby possible to save total height compared with known designs.

Intermediate lever 7 is designed like load lever 2. It has two webs 69 on edge, which, like webs 20 of load lever 2, are manufactured by stamping cold rolled bands. These webs 69 have in their middle part a polygonal hole 71 in which a twin knife body 70 is mounted. Webs 69 present furthermore two holes 72, two holes 74 for fixing output knife 10 left of the middle and two holes 75 for fixing parts of a shock absorber right of the middle.

Webs 69 are fixed to each other by means of distance sleeves 78, bolts 76 and nuts 77. Output knife 10 is fixed by means of four screws 79 introduced in holes 74, it also serves as a distance piece for both webs 69. Similarly a distance piece can be mounted between holes 75 together with the parts of the shock absorber.

Four notches 80 of the input knife 6 determine the point where the input force acts. Supporting knife 8 has four corresponding notches 80' which determine where intermediate lever is supported on the frame. In contrast to body 35 of load levers 2, body 70 of intermediate lever 7 protrudes outside its two webs 69.

I claim:
1. A load lever for transmitting forces in a balance comprising:
    two substantially parallel webs,
    at least one distance sleeve separating said webs,
    first fastening means for holding said webs together,
    at least one pair of pins mounted at one end of said parallel webs,
    a first knife bearing body slidably mounted in a longitudinal direction between said at least one pair of pins,
    second fastening means for fixing said first knife bearing body at a selected longitudinal position, and
    a second knife bearing body position on the other end of said parallel webs and containing on one end a support knife and on the other end a load knife, said second knife bearing body passing through holes in at least one of said parallel webs.
2. A load lever as in claim 1 wherein the distance between the knife on said first knife bearing body and the knives on said second knife bearing body is greater than the distance between the knives on said second knife bearing body.

* * * * *